US009141195B2

(12) United States Patent
Huang

(10) Patent No.: US 9,141,195 B2
(45) Date of Patent: Sep. 22, 2015

(54) ELECTRONIC DEVICE AND METHOD USING A TOUCH-DETECTING SURFACE

(71) Applicant: Motorola Mobility LLC, Libertyville, IL (US)

(72) Inventor: Meng Huang, Beijing (CN)

(73) Assignee: Google Technology Holdings LLC, Mountain View, CA (US)

( * ) Notice: Subject to any disclaimer, the term of this patent is extended or adjusted under 35 U.S.C. 154(b) by 192 days.

(21) Appl. No.: 13/647,427

(22) Filed: Oct. 9, 2012

(65) Prior Publication Data

US 2013/0093705 A1 Apr. 18, 2013
US 2015/0103013 A9 Apr. 16, 2015

Related U.S. Application Data

(63) Continuation of application No. PCT/CN2010/072127, filed on Apr. 23, 2010.

(51) Int. Cl.
*G06F 3/041* (2006.01)
*G06F 3/01* (2006.01)
*G06F 3/0488* (2013.01)

(52) U.S. Cl.
CPC ............ *G06F 3/017* (2013.01); *G06F 3/04883* (2013.01)

(58) Field of Classification Search
None
See application file for complete search history.

(56) References Cited

U.S. PATENT DOCUMENTS 7,030,861 B1   4/2006  Westerman et al.
7,142,205 B2  11/2006  Chithambaram et al.
2006/0001650 A1  1/2006  Robbins et al.
2006/0026521 A1  2/2006  Hotelling et al.
2007/0262694 A1 11/2007  Mikoshiba et al.
2008/0015115 A1  1/2008  Guyot-Sionnest et al.
2008/0309626 A1 12/2008  Westerman et al.

(Continued)

FOREIGN PATENT DOCUMENTS

CN      101131811       2/2008
CN        1885248      11/2008

(Continued)

OTHER PUBLICATIONS

Patent Cooperation Treaty, "PCT Search Report and Written Opinion of the International Searching Authority" for International Application No. PCT/US2009/067811, Mar. 15, 2010, 13 pages.

(Continued)

*Primary Examiner* — Joseph Haley
(74) *Attorney, Agent, or Firm* — Shumaker & Sieffert, P.A.

(57) ABSTRACT

An electronic device includes a processor and one or more touch-detecting surfaces for detecting a gesture sequence including a first touch gesture and a subsequent second touch gesture. A related method includes detecting a first touch gesture applied to the touch-detecting surface; and initiating a sequential touch mode if the first touch gesture has a predetermined characteristic. When in the sequential touch mode, the method detects a second touch gesture that is subsequently applied to the touch-detecting surface, wherein the second touch gesture includes a glide movement. The method determines a first parameter and a second parameter associated with the second touch gesture, identifies a corresponding device function in accordance with the determined first parameter, and controls the execution of the identified device function in accordance with the determined second parameter.

19 Claims, 6 Drawing Sheets

(56) References Cited

U.S. PATENT DOCUMENTS

| | | | |
|---|---|---|---|
| 2009/0079700 A1 | 3/2009 | Abernathy | |
| 2010/0060588 A1 | 3/2010 | Fong | |
| 2010/0125786 A1* | 5/2010 | Ozawa et al. | 715/702 |
| 2010/0149114 A1 | 6/2010 | Li | |
| 2011/0148804 A1* | 6/2011 | Yeh et al. | 345/174 |
| 2013/0265237 A1* | 10/2013 | MirHosseinZadeh Sarabi et al. | 345/173 |

FOREIGN PATENT DOCUMENTS

| | | |
|---|---|---|
| CN | 101356493 | 1/2009 |
| CN | 101458585 | 6/2009 |
| CN | 101681234 | 3/2010 |
| EP | 0557284 A | 9/1993 |
| WO | 9209038 A1 | 5/1992 |
| WO | 03042804 A1 | 5/2003 |
| WO | 2006020305 A2 | 2/2006 |
| WO | 2008030779 A2 | 3/2008 |
| WO | 2008085784 A2 | 7/2008 |

OTHER PUBLICATIONS

United States Patent and Trademark Office, "Non-Final Rejection" for U.S. Appl. No. 12/355,746, Jun. 18, 2012, 19 pages.

Patent Cooperation Treaty, "PCT Search Report and Written Opinion of the International Searching Authority" for International Application No. PCT/CN2010/072127, Feb. 10, 2011, 12 pages.

Chinese Office Action from counterpart Chinese Application No. 201080066392.1, dated Jan. 4, 2015, 16 pp.

* cited by examiner

ELECTRONIC DEVICE AND METHOD USING A TOUCH-DETECTING SURFACE

FIELD OF THE INVENTION

The present invention relates to sequential touch gestures for simulating simultaneous touch gestures using a touch-detecting surface of an electronic device.

BACKGROUND

Electronic devices such as mobile phones, smart phones, and other handheld or portable electronic devices such as personal digital assistants (PDAs), audio players, headsets, etc. have become popular and ubiquitous. As more and more features have been added to such devices, there has been an increasing desire to equip them with input/output mechanisms that accommodate numerous user commands and/or react to numerous user behaviors. For example, many mobile devices are now equipped not only with various buttons and/or keypads, but also with touch-detecting surfaces such as touch screens or touch pads by which a user, simply by touching the surface of the mobile device and/or moving the user's finger along the surface of the mobile device, is able to communicate to the mobile device a variety of instructions.

A so-called multi-touch touch-detecting surface allows for the detection of multiple touches that occur simultaneously, while a single-touch touch-detecting surface only allows for the detection of a single touch at a time. Multi-touch surfaces are advantageous in that various gesture combinations performed using two or more simultaneous touches (such as using two fingers) are detectable, so that a richer and more varied set of device functions (such as scaling and translation) can be controlled in a straightforward manner. For example, two fingers moving apart on a multi-touch touch-detecting surface can be used to zoom out on an associated map or document or photograph, while two fingers moving together can be used to zoom in. Also, two fingers moving together across a multi-touch touch-detecting surface can be used to translate an item at twice the speed compared to moving just one finger across the touch-detecting surface. However, multi-touch touch-detecting surfaces are in general more expensive and complex than single-touch touch-detecting surfaces, so that single-touch surfaces are advantageous from a cost and simplicity standpoint. Further, in certain circumstances, it can be difficult for a user to interact with an electronic device using simultaneous touches, such as when a user has only one finger (e.g., a thumb) available for touch interaction or otherwise has limited finger mobility due to, for example, injury or arthritis.

DETAILED DESCRIPTION OF THE PREFERRED EMBODIMENT

An electronic device with a processor and one or more touch-detecting surfaces detects sequential touches, identifies a corresponding gesture sequence, and operates to control the execution of various device functions such as a scaling function (zooming in and out), a translation function (scrolling and panning), and a rotation function, which are associated with an item displayed on a display screen of the electronic device. A corresponding method controls the execution of such electronic device functions. The functionality of an electronic device having a multi-touch touch-detecting surface and capable of detecting multiple simultaneous touches can be emulated using sequential touches on a touch-detecting surface, providing a simpler user experience because simultaneous touches are not required. The touch-detecting surface can take the form of a single-touch touch-detecting surface, thereby providing simplicity and saving cost as compared to the use of a multi-touch touch-detecting surface. The touch-detecting surface can alternately be a multi-touch touch-detecting surface that receives single-touch user interactions. The touch-detecting surfaces can be any of a variety of known touch-detecting technologies such as a resistive technology, a capacitive technology, an optical technology, or others.

Figure 1:
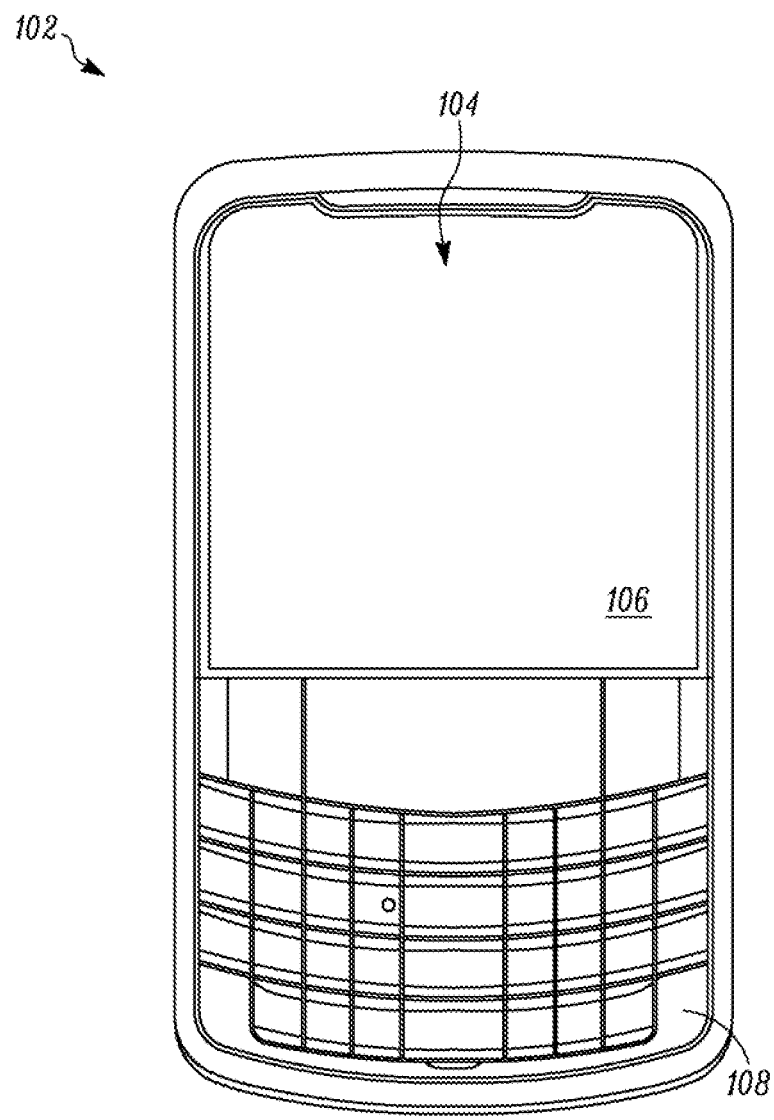
FIG. 1 is a front view of an exemplary electronic device that employs a single-touch touch-detecting surface wherein the electronic device is capable of emulating a multi-touch touch-detecting surface in accordance with one embodiment.

Referring to FIG. 1, an exemplary electronic device 102 is shown as a mobile smart phone, which can include various functions such as email, messaging, and internet browsing functions, as well as various other functions. In other embodiments, the device can be one of a variety of other electronic devices such as a personal digital assistant, an audio and/or video player, a headset, a navigation device, a notebook, laptop or other computing device, or any other device that can utilize or benefit from a touch-detecting surface. The touch-detecting surface can be either a touch screen or a touch pad. As illustrated, device 102 includes a touch-detecting surface 104 which can be a light permeable panel or other technology which overlaps a display screen 106 to create a touch screen on all or a portion of the display screen 106. A touch screen is advantageous because an item being manipulated can be displayed directly underlying the touch-detecting surface on which controlling touch gestures are applied. The electronic device 102 can also include a keypad 108 having numerous keys for inputting various user commands for operation of the device.

Figure 2:
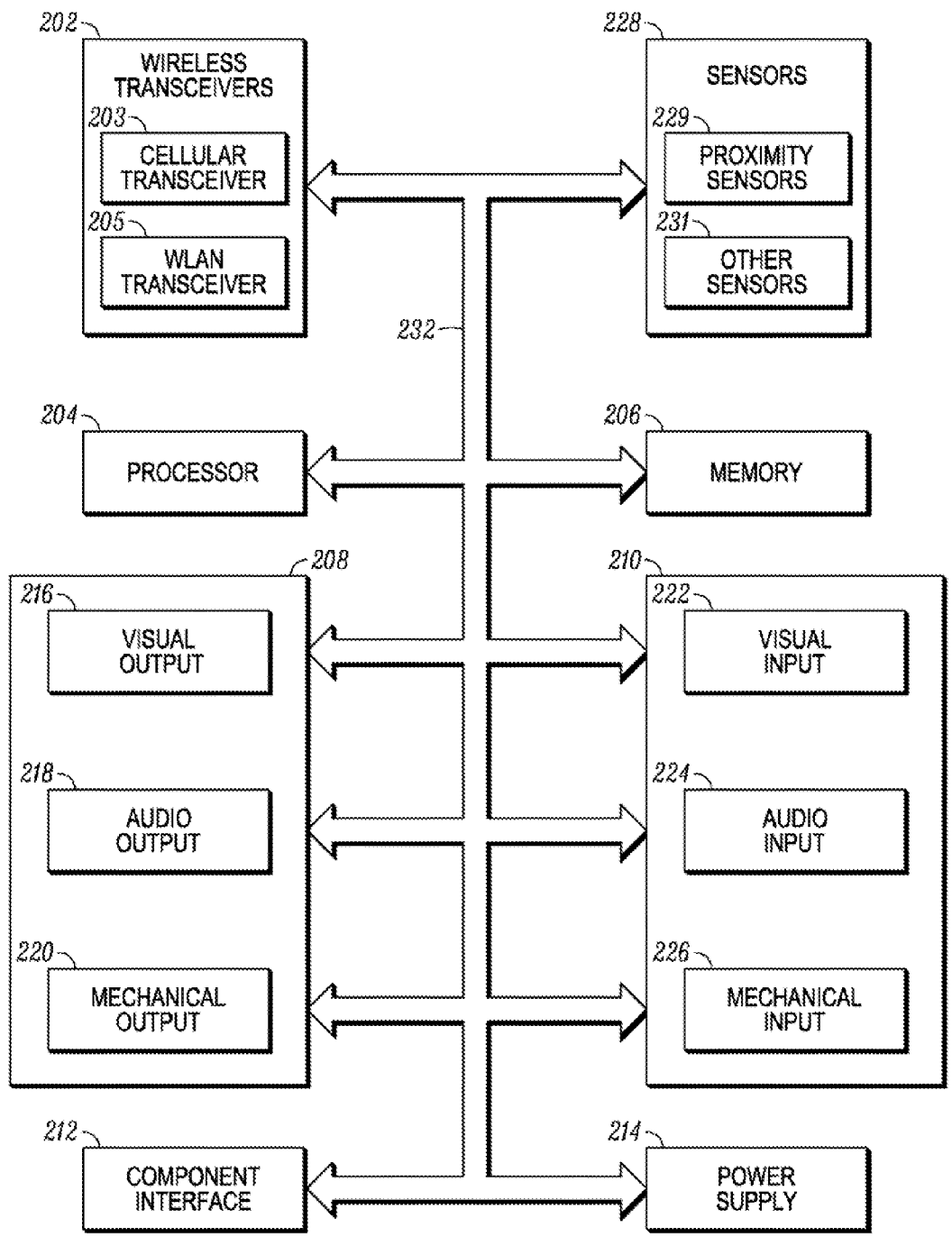
FIG. 2 is a block diagram showing exemplary components of the electronic device of FIG. 1.

Referring to FIG. 2, a block diagram 200 illustrates exemplary internal components of the mobile smart phone implementation of the electronic device 102. These components can include wireless transceivers 202, a processor 204 (e.g., a microprocessor, microcomputer, application-specific integrated circuit, or the like), memory 206, one or more output components 208, one or more input components 210, and one or more sensors 228. The device can also include a component interface 212 to provide a direct connection to auxiliary components or accessories for additional or enhanced functionality, and a power supply 214, such as a battery, for providing power to the other internal components. All of the internal components can be coupled to one another, and in communication with one another, by way of one or more internal communication links 232 such as an internal bus.

More specifically, the wireless transceivers 202 can include both cellular transceivers 203 and a wireless local area network (WLAN) transceiver 205. Each of the wireless transceivers 202 utilizes a wireless technology for communication, such as cellular-based communication technologies including analog communications (using AMPS), digital communications (using CDMA, TDMA, GSM, iDEN, GPRS, EDGE, etc.), and next generation communications (using UMTS, WCDMA, LTE, IEEE 802.16, etc.) or variants thereof, or peer-to-peer or ad hoc communication technologies such as HomeRF, Bluetooth and IEEE 802.11 (a, b, g or n), or other wireless communication technologies.

The memory 206 can encompass one or more memory devices of any of a variety of forms (e.g., read-only memory, random access memory, static random access memory, dynamic random access memory, etc.), and can be used by the processor 204 to store and retrieve data. The data that is stored by the memory portion 206 can include operating systems, applications, and informational data. Each operating system includes executable code that controls basic functions of the communication device, such as interaction among the various internal components, communication with external devices via the wireless transceivers 202 and/or the component interface 212, and storage and retrieval of applications and data to and from the memory portion 206. Each application includes executable code that utilizes an operating system to provide more specific functionality for the communication devices, such as file system service and handling of protected and unprotected data stored in the memory portion 206. Informational data is non-executable code or information that can be referenced and/or manipulated by an operating system or application for performing functions of the communication device.

Exemplary operation of the wireless transceivers 202 in conjunction with others of the internal components 200 of the electronic device 102 can take a variety of forms and can include, for example, operation in which, upon reception of wireless signals, the internal components detect communication signals and the transceiver 202 demodulates the communication signals to recover incoming information, such as voice and/or data, transmitted by the wireless signals. After receiving the incoming information from the transceiver 202, the processor 204 formats the incoming information for the one or more output devices 208. Likewise, for transmission of wireless signals, the processor 204 formats outgoing information, which may or may not be activated by the input devices 210, and conveys the outgoing information to one or more of the wireless transceivers 202 for modulation as communication signals. The wireless transceiver(s) 202 convey the modulated signals to a remote device, such as a cell tower or an access point (not shown).

The output components 210 can include a variety of visual, audio, and/or mechanical outputs. For example, the output devices 208 can include one or more visual output devices 216 including the display screen 106, which can be a liquid crystal display. One or more audio output devices 218 can include a speaker, alarm, and/or buzzer, and a mechanical output device 220 can include a vibrating mechanism for example. Similarly, the input devices 210 can include one or more visual input devices 222 such as an optical sensor of a camera, an audio input device 224 such as a microphone, and a mechanical input device 226. In particular, the mechanical input device 226 can include, among other things, the touch-detecting surface 104, and the keypad 108 of FIG. 1. Actions that can actuate one or more input devices 210 can include for example, opening the electronic device, unlocking the device, moving the device, and operating the device.

The sensors 228 can include both proximity sensors 229 and other sensors 231, such as an accelerometer, a gyroscope, or any other sensor that can provide pertinent information, such as to identify a current location or orientation of the device 102.

The touch-detecting surface 104 provides a signal via link 232 to the processor 204 indicative of an applied touch gesture. The processor monitors output signals from the touch-detecting surface 104 and, in conjunction therewith, can detect applied touch gestures having appropriate characteristics, and can determine a location (e.g., co-ordinates) of the applied touch on the touch-detecting surface 104. As more fully described below, the processor 204 can also be programmed to determine one or more other parameters associated with a touch gesture, such as a relative location with respect to another touch gesture, a movement amount (e.g., a touch distance), a direction, a speed, and/or a duration of a glide movement portion of the touch gesture. Further, the processor can be programmed to identify a touch gesture sequence and thus a corresponding device function to control according to one or more of the determined parameters. For example, the relative location of first and second touch gestures and/or a glide movement direction or movement pattern can be used to determine whether the touch gesture sequence is one associated with a scaling function, a rotation function, or a translation function, such that instructions can then be generated to control the execution of the corresponding device function in accordance with another of the determined parameters, such as a glide movement touch distance.

Figure 3A:
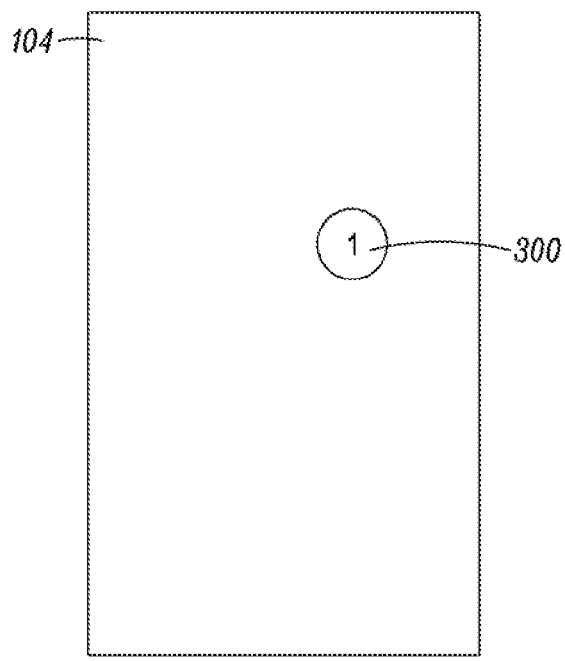
FIGS. 3A, 3B, 4A, 4B, 5A, and 5B show in schematic form several exemplary gesture sequences in accordance with some embodiments.
Figure 3B:
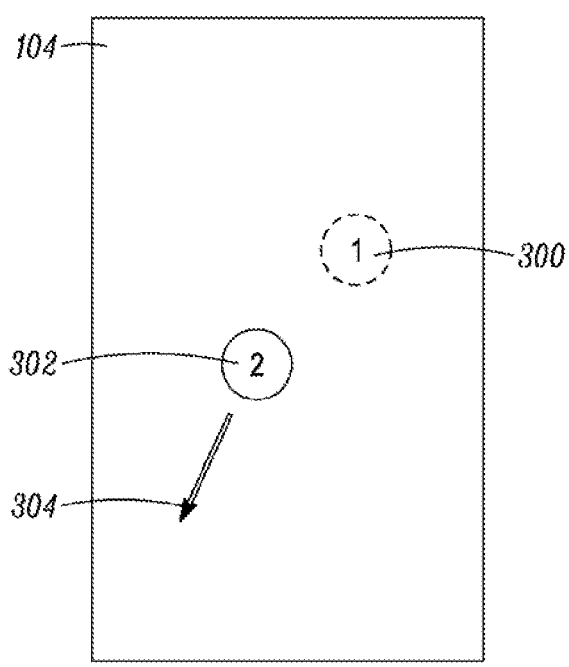
Figure 4A:
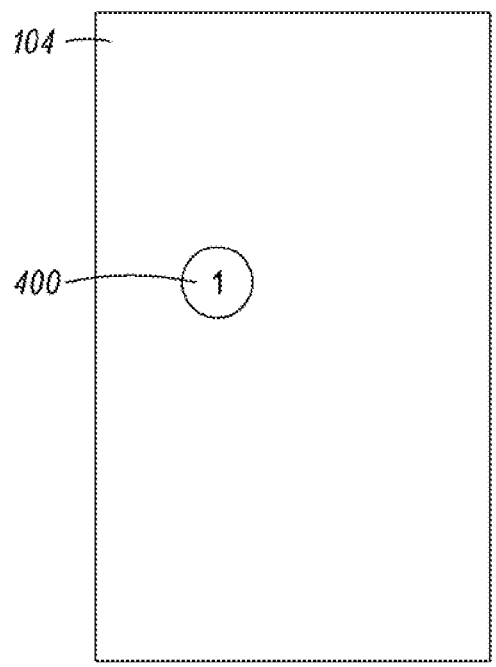
Figure 4B:
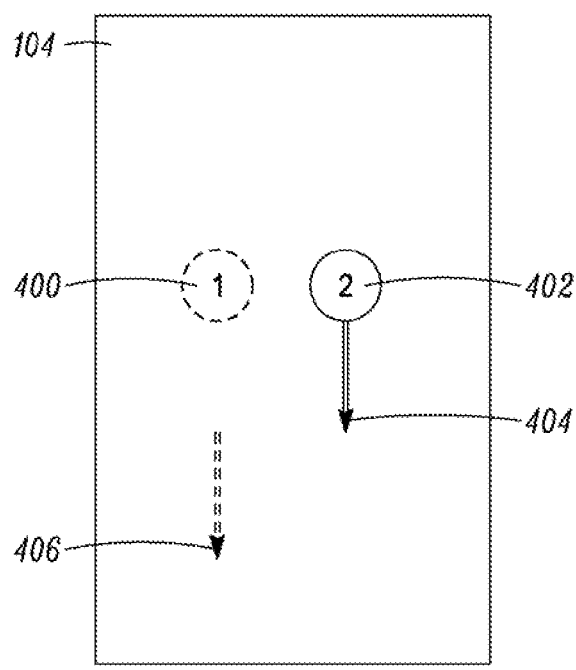
Figure 5A:
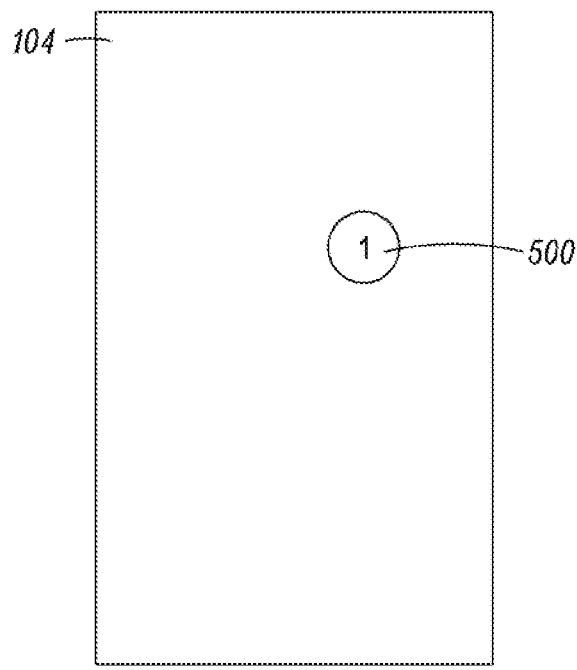
Figure 5B:
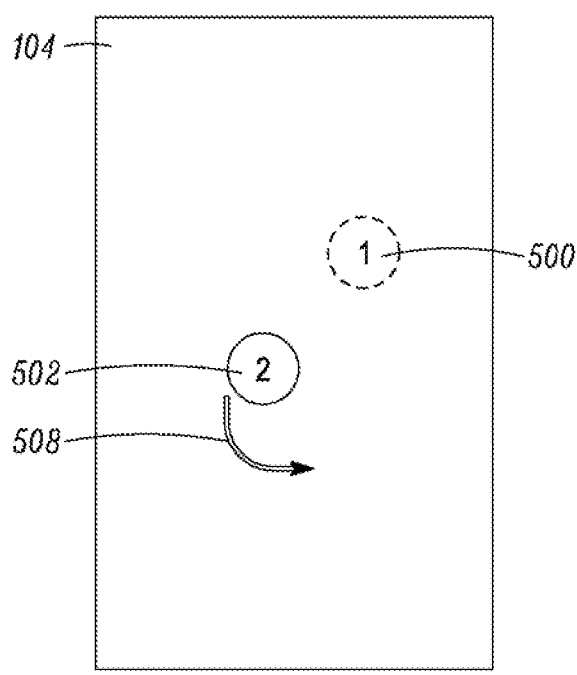

Controlling device functions of the device 102 with a sequence of single-touch touch gestures is explained with reference to FIGS. 3-5. These figures illustrate various examples of a touch gesture sequence used to control the display of an item (such as a picture, web page, map, text block, etc) on the display screen 106 of the electronic device using the touch-detecting surface 104. Specifically, FIGS. 3(a)-3(b) illustrate a touch gesture sequence for controlling a scaling function of the electronic device 102, such as to zoom in and zoom out on a displayed item. FIGS. 4(a)-4(b) illustrate a touch gesture sequence for controlling a translation function of a displayed item on the electronic device, and FIGS. 5(a)-5(b) illustrate a touch gesture sequence for controlling a rotation function of a displayed item on the electronic device. Various other touch gesture sequences can be defined to control other electronic device functions as well.

In particular, as shown in FIG. 3(a), a first single-touch touch gesture can be applied on the touch detecting surface 104, such as at location 300. As shown in FIG. 3(b), the first touch gesture can be followed by a second single-touch touch gesture beginning at an initial location 302, wherein the second touch gesture includes a glide movement as indicated by arrow 304. Because the second touch gesture begins at location 302, which is to the left of location 300 for example, this can indicate that a scaling (zoom) function is desired. In other words, the starting point of the second touch gesture, relative to the first touch gesture (e.g., to the left), may indicate the desired function. Because the glide movement of the second touch gesture occurs in a linear direction away from location 300, this can indicate that a zoom out scaling function is desired. Thus, the direction of the glide movement may control the execution of the function. To zoom in, a linear glide movement could be directed toward the first touch location 300. The center of the scaling function can be defined by the location 300, by the location 302, or by a midpoint between these locations, and the amount of scaling can correspond to a touch distance of the glide movement.

The touch gestures can be provided by way of touching the touch-detecting surface 104 by various means, including for example using a finger (including a thumb), fingernail, hand or portion thereof, or a stylus device. In some embodiments, the touch-detecting surface 104 can be activated by way of other types of actions, such as by swiping, pinching, and applying pressure, which actions are all considered touches. However, the touch-detecting surface 104 need not be capable of distinguishing between different pressures or forces of touches. Further, as used herein, a glide movement occurs when a finger or other object remains in contact with the touch detecting surface, for an amount determined by the user and as more fully described below.

The touch gesture sequence of FIGS. 3(a)-(b) can have the same effect as a gesture wherein two fingers simultaneously touching a multi-touch touch-detecting surface are moved apart to zoom out on a displayed item (or moved together to zoom in on a displayed item).

FIGS. 4(a)-4(b) illustrate a touch gesture sequence for controlling a translation function of the device 102 display controller, such as to move (scroll, pan) a displayed item or object or portion thereof such that a different portion of that item is then viewable on the display screen 106. In particular, as shown in FIG. 4(a), a first single-touch touch gesture can be applied such as at a location 400 of the touch-detecting surface 104. As shown in FIG. 4(b), the first touch gesture can be followed by a second single-touch touch gesture at an initial location 402, wherein the second touch gesture includes a glide movement as indicated by arrow 404, wherein a finger or other object remains in contact with the touch detecting surface for a measurable amount. In this example, because the second touch gesture begins at location 402, which is to the right of location 400, this can indicate that a translation function is desired. In one embodiment, the second touch gesture alone (defined by a location 402 and glide movement defined by arrow 404) would result in a translation of the displayed image roughly equivalent to the speed and direction of the glide movement. However, the illustrated touch gesture sequence can be used to increase the translation speed of an item on the display screen by a predetermined factor such as two (indicated by arrow 406), such that it can have the same (or similar) effect as a multi-touch gesture wherein two fingers are simultaneously touching a multi-touch touch-detecting surface and are moved together along the surface to scroll or pan on a displayed item at an increased speed as compared to the use of a single finger glide movement. Scrolling up could be controlled by gliding 404 up instead of down. Similarly, scrolling left could be controlled by gliding left, and scrolling right could be controlled by gliding right.

FIGS. 5(a)-5(b) illustrate a touch gesture sequence for controlling a rotation function of the device 102, in order to rotate an item on the display screen 106 to effect a desired orientation of the item on the display screen. Again, a first touch gesture can be applied at a location 500, followed by a subsequent second touch gesture including a glide movement, such as in an arc denoted by arrow 504, starting from an initial location 502. Because the second gesture begins at location 502, which is to the left of area 500 this can indicate, for example, that either a zoom function or a rotation function is desired. Because the subsequent glide movement is arc-like, the processor can determine that a rotation function is desired. If the glide movement had been linear, a zoom function would have been implemented.

The arc 504 is shown as counter-clockwise, which can control the rotation in a counter-clockwise direction. If the arc was in a clockwise direction, the displayed item's rotation would be controlled in a clockwise direction. The rotation of the item can occur around an axis defined by the location 500 of the first touch gesture, the starting location 502 of the second touch gesture, or at a midpoint between these locations, and the amount of rotation (e.g., degrees of rotation) of the object can correspond to the amount of the glide movement. This touch gesture can have the same effect as a gesture wherein two fingers are simultaneously touching a multi-touch touch-detecting surface and one is rotating around the other (or both touches are rotating about a center point) to effect rotation of a displayed item.

Figure 6:
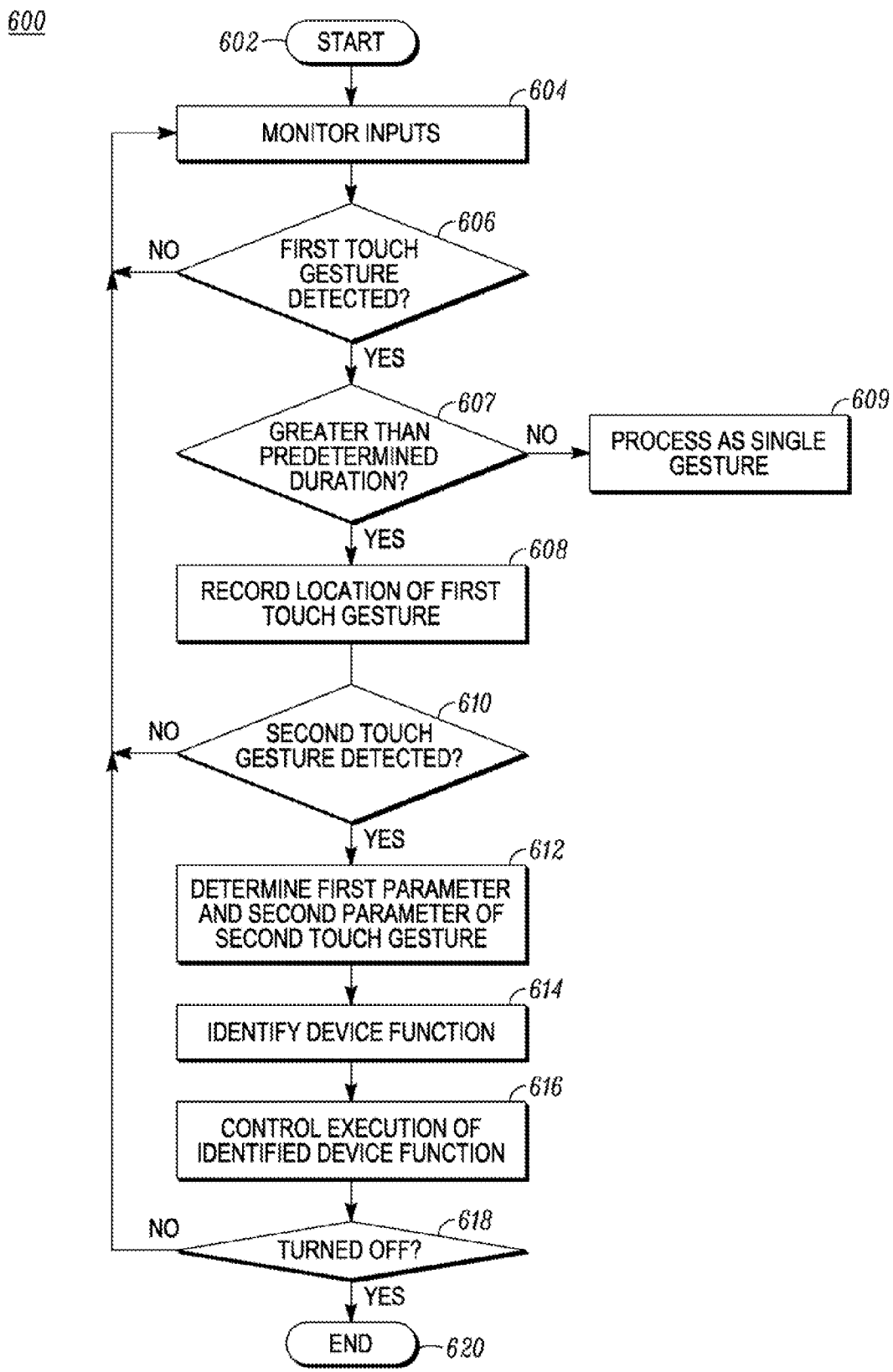
FIG. 6 is a flowchart showing exemplary steps of a method that can be performed by the electronic device of FIGS. 1 and 2.

Referring now to FIG. 6, a flowchart 600 is shown which includes exemplary steps of operation of the electronic device 102. The process starts at a step 602 when the electronic device is turned on for use or is otherwise initialized in a known manner. Next, at a step 604, the electronic device monitors user inputs, though remains in a single-touch mode.

At a step 606, the electronic device detects whether a first touch gesture is applied to the touch detecting surface 104. If not, processing proceeds to step 604, and if so, processing proceeds to a step 607. At a step 607, it is determined whether a proper first touch gesture has occurred, that is, whether the first touch gesture has a characteristic such that indicates that a sequential single-touch mode should be initiated. A proper first touch gesture occurs for example when a touch gesture is applied to the touch-detecting surface for a duration that is greater than a predetermined duration. For this purpose, the processor can be programmed to determine a duration of the applied first touch gesture. In other embodiments, a proper first touch gesture can be one that is defined by another predetermined characteristic, such as being applied to a designated location of the touch-detecting surface.

If a proper first touch gesture is not detected, then processing proceeds to step 609. At step 609, the touch gesture is processed as a normal (non-sequence) single-touch touch gesture. If a proper first touch gesture is detected, then processing proceeds to step 608.

At step 608, the electronic device determines and records the location of the first touch gesture, and continues to monitor user inputs. Processing then proceeds to a step 610, at which the electronic device determines whether a proper second touch gesture is applied to the touch detecting surface. A proper second touch gesture can occur for example when a second touch gesture is applied to a location on the touch-detecting surface, such as a second designated touch area, and/or if the second touch gesture occurs within a predetermined time from the first touch gesture, and/or if a stationary portion of the second touch gesture is applied for a duration that is greater than a predetermined duration. For example, if there is no second touch gesture after a predetermined time period such as two seconds, then a proper second touch gesture is not detected.

If a proper second touch gesture is not detected, then processing again proceeds to step 604. If a proper second touch gesture is detected, then processing proceeds to step 612. At step 612, a first parameter and a second parameter of the second touch gesture are determined in order to identify a corresponding device function to be controlled at a step 614 and to control the identified device function in a desired way at a step 616.

With respect to the first parameter, this can be a relative location of the second touch gesture's initial location with respect to the first touch gesture's location. For example, with reference to FIGS. 3(a)-(b), 4(a)-(b), and FIG. 5(a)-(b), a second touch gesture that is applied to the left of an applied first touch gesture can be used to indicate that a zoom function or a rotation function is desired, and a second touch gesture that is applied to the right of an applied first touch gesture can be used to indicate that a translation function is desired. In some cases, the relative location of the first and second touch gestures can also be used in combination with the glide movement that occurs as part of the second touch gesture. For example, a second touch gesture starting to the left of a first touch gesture in combination with an arc-like glide movement can be used to indicate that a rotation function is desired and a second touch gesture starting to the right of a first touch gesture, in combination with a linear glide movement can be used to indicate that a zoom function is desired. Thus at step 614, the electronic device can identify the corresponding function to be controlled based on the determined first parameter.

At step 616, the device can control the execution of the identified device function based on the determined second parameter. With respect to the second parameter, this can be a movement amount (touch distance) of the glide movement, a movement shape (e.g., linear or arcuate), a movement direction (e.g., toward or away from the first touch location; a horizontal, vertical, or diagonal direction; a clockwise or counter-clockwise direction; etc.), or a glide movement's duration or speed. A movement amount of a glide movement can be determined at various points during the glide movement and can then be used to control a corresponding function, such as to control the amount of scaling, the amount of translation, or the amount of rotation of a displayed item. After the glide movement is completed (for example when a finger is removed from the touch-detecting surface), the control of the device function can be terminated.

At a step 618, the device determines whether the sequential touch-detecting routine has been turned off. If not, the process returns to step 604. If so, the process ends at step 620.

By utilizing a touch-detecting surface to recognize two or more predefined single-touch gestures in sequence, the functionality provided by a multi-touch touch-detecting surface can be achieved, and touch gesture sequences which are easy to perform can be defined.

It is specifically intended that the present invention not be limited to the embodiments and illustrations contained herein, but include modified forms of those embodiments, including portions of the embodiments and combinations of elements of different embodiments as come within the scope of the following claims.

I claim:

1. An electronic device comprising:
   a touch-detecting surface; and
   at least one processor in electronic communication with the touch-detecting surface, the at least one processor being programmed to:
   receive an indication of a first touch gesture performed at the touch-detecting surface;
   responsive to determining that the first touch gesture has a predetermined characteristic, initiate a sequential touch mode of the electronic device;
   responsive to initiating the sequential touch mode, receive an indication of a second touch gesture performed at the touch-detecting surface, wherein the second touch gesture includes a glide movement, and wherein the second touch gesture is performed subsequent to completion of the first touch gesture;
   determine a first parameter and a second parameter of the second touch gesture, wherein the first parameter represents an initial location of the second touch gesture relative to a location of the first touch gesture;
   determine, based at least in part on the first parameter, a device function from a plurality of device functions of the electronic device; and
   control execution of the device function in accordance with the second parameter.

2. The electronic device of claim 1, wherein the at least one processor programmed to initiate the sequential touch mode of the computing device is programmed to:
   initiate the sequential touch mode if a duration of the first touch gesture is greater than a predetermined duration.

3. The electronic device of claim 1, wherein the at least one processor is further programmed to:
   determine whether the second touch gesture occurred within a predetermined period after the first touch gesture; and
   responsive to determining that the second touch gesture did not occur within the predetermined period, exit the sequential touch mode.

4. The electronic device of claim 1, wherein the at least one processor is further programmed to:
   determine whether the second touch gesture continues for a duration greater than a predetermined duration; and
   responsive to determining that the second touch gesture continues for the duration greater than the predetermined duration, exit the sequential touch mode.

5. The electronic device of claim 1, wherein the device function of the electronic device comprises at least one of a scaling function, a translation function, or a rotation function.

6. The electronic device of claim 1, wherein the device function modifies a display of an item displayed at a display screen of the electronic device.

7. A method comprising:
   receiving, by a computing device, an indication of a first touch gesture performed at a touch-detecting surface;
   responsive to determining that the first touch gesture has a predetermined characteristic, initiating, by the computing device, a sequential touch mode of the computing device;
   responsive to initiating the sequential touch mode, receiving, by the computing device, an indication of a second touch gesture performed at the touch-detecting surface, wherein the second touch gesture includes a glide movement, and wherein the second touch gesture is performed subsequent to completion of the first touch gesture;
   determining, by the computing device, a first parameter and a second parameter associated with the second touch gesture, wherein the first parameter represents an initial location of the second touch gesture relative to a location of the first touch gesture;
   determining, by the computing device and based at least in part on the first parameter, a device function from a plurality of device functions of the computing device; and
   controlling, by the computing device, execution of the device function in accordance with the second parameter.

8. The method of claim 7, wherein initiating the sequential touch mode comprises initiating the sequential touch mode if the duration of the applied first touch gesture is greater than a predetermined duration.

9. The method of claim 7, further comprising:
   determining whether the second touch gesture occurred within a predetermined period after the first touch gesture; and
   responsive to determining that the second touch gesture did not occur within the predetermined period, exiting the sequential touch mode.

10. The method of claim 7, further comprising:
    determining whether the second touch gesture continues for a duration less than a predetermined duration; and
    responsive to determining that the second touch gesture continues for the duration less than the predetermined duration, exiting the sequential touch mode.

11. The method of claim 7, wherein the device function comprises at least one of a scaling function, a translation function, or a rotation function.

12. The method of claim 11, wherein the device function modifies a display of an item displayed at a display screen.

13. The method of claim 7, wherein the second parameter comprises one of a distance, a duration, or a speed of the glide movement.

14. The method of claim 7, wherein determining the first parameter includes determining a movement pattern of the glide movement and wherein determining the device function includes identifying the device function in accordance with the determined movement pattern.

15. The electronic device of claim 1, wherein the at least one processor programmed to determine the device function is programmed to:
  responsive to determining that the first parameter indicates that the initial location of the second touch gesture is to a first side of the location of the first touch gesture, determine a first device function; and
  responsive to determining that the first parameter indicates that the initial location of the second touch gesture is to a second side of the location of the first touch gesture, determine a second device function, wherein the second side is opposite the first side, and wherein the second device function is different from the first device function.

16. The electronic device of claim 15, wherein the first side comprises an area of the touch-detecting surface to the right of the location of the first touch gesture, and wherein the second side comprises an area of the touch-detecting surface to the left of the location of the first touch gesture.

17. The electronic device of claim 15, wherein the first side comprises an area of the touch-detecting surface above the location of the first touch gesture, and wherein the second side comprises an area of the touch-detecting surface below the location of the first touch gesture.

18. The electronic device of claim 15, wherein the first device function comprises a zoom function, and wherein the second device function comprises a translation function.

19. The method of claim 7, wherein determining the device function comprises:
  responsive to determining that the first parameter indicates that the initial location of the second touch gesture is to a first side of the location of the first touch gesture, determining a first device function; and
  responsive to determining that the first parameter indicates that the initial location of the second touch gesture is to a second side of the location of the first touch gesture, determining a second device function, wherein the second side is opposite the first side, and wherein the second device function is different from the first device function.

* * * * *